June 25, 1935.  A. D. ZOOK  2,005,925

DEVICE FOR USE IN CLEANING STEERING WHEELS

Filed May 31, 1934    2 Sheets-Sheet 1

Inventor
A. D. Zook
By Lloyd W. Patch
Attorney

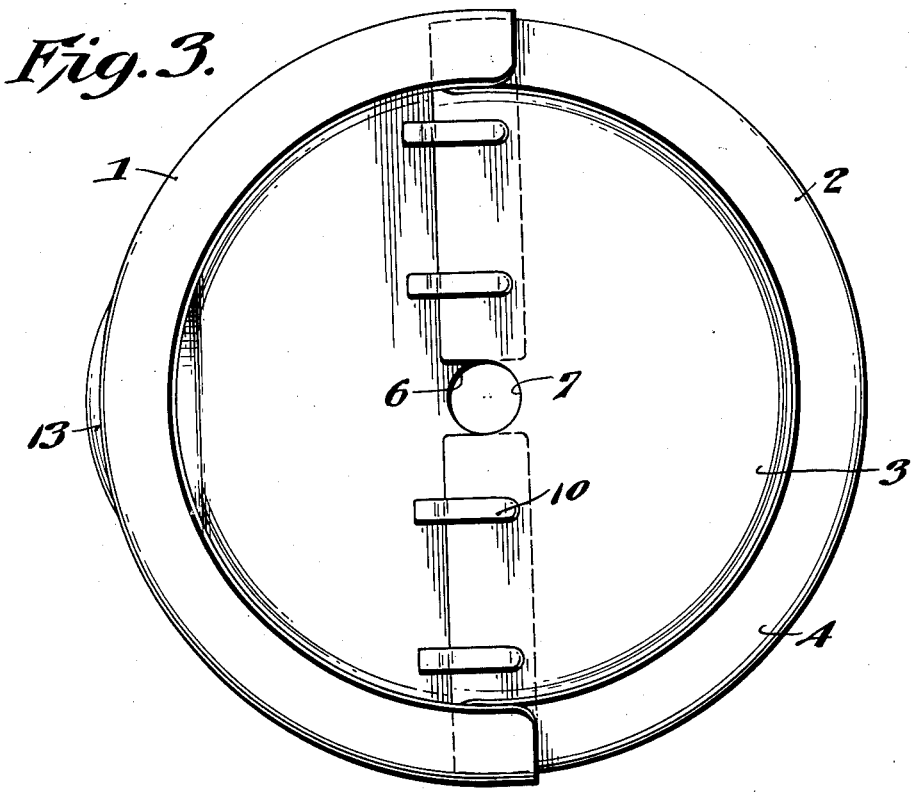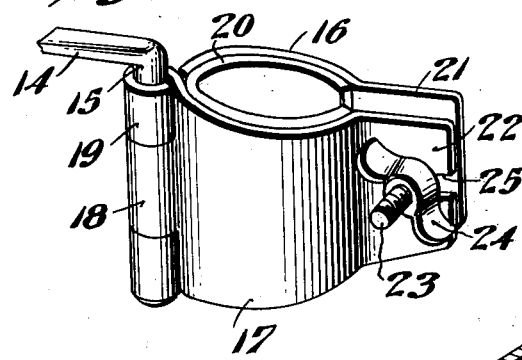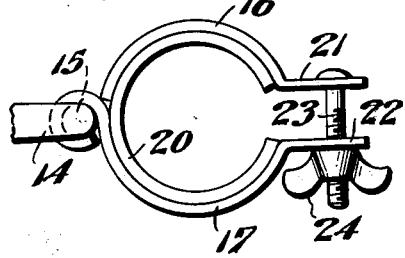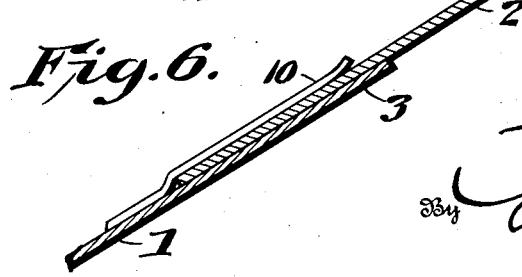

Patented June 25, 1935

2,005,925

UNITED STATES PATENT OFFICE 2,005,925

DEVICE FOR USE IN CLEANING STEERING WHEELS

Alvin Dean Zook, Pueblo, Colo.

Application May 31, 1934, Serial No. 728,416

10 Claims. (Cl. 15—257)

My invention relates to devices for use in cleaning steering wheels, and particularly to a device of this character that will permit a service station attendant, or other workman, or other individual to clean the steering wheel of an automobile, a motor boat, an aeroplane, or any other steering wheel without inconvenience to the driver and without injury to or soiling of upholstery of the driver's seat, floor mats or carpets, or other portions of an automobile, or other structure.

An object of my invention is to provide a structure of this character that can be mounted upon the steering wheel column of an automobile, and which will permit washing or other cleaning or cleansing of the steering wheel, while absolutely precluding danger or the possibility of splashing cleansing liquid upon the upholstery, floor mats or carpets, or other portions of the automobile.

Another object is to so construct the parts that the device can be readily and conveniently fitted in place for use, and as readily removed, thus expediting and facilitating the operation of cleaning the steering wheel, and making it possible to render a steering wheel cleaning service while the customer waits, or in conjunction with and in addition to other service operations, such as car washing, greasing, windshield cleaning, and the many service operations and courtesies now extended in filling stations, service stations, and other establishments.

Another object and purpose is to provide a structure in which the cleaning liquid is removed from proximity to the steering wheel, so that in the placement and removal of the device there is not the danger of accidentally spilling or splashing the cleaning fluid, and at the same time the steering wheel is constantly clear of possible submergence in the liquid, thus permitting free and ready washing or cleansing with a brush, or other suitable implement or appliance and free and ready drying and polishing of the steering wheel.

With the above and other objects in view, which will be apparent to those skilled in the art, my invention includes certain novel features of construction and combinations of parts which will be hereinafter set forth in connection with the drawings and then pointed out in the claims.

In the drawings:

Fig. 3 is a plan view looking down into the device.

Fig. 4 is a fragmentary perspective view to better show one form of mounting structure adapted for use with the device.

Fig. 5 is a plan view of the structure illustrated in Fig. 4.

Fig. 6 is a fragmentary sectional view showing one form of clip adapted to hold the parts in assembled relation.

Figure 1:
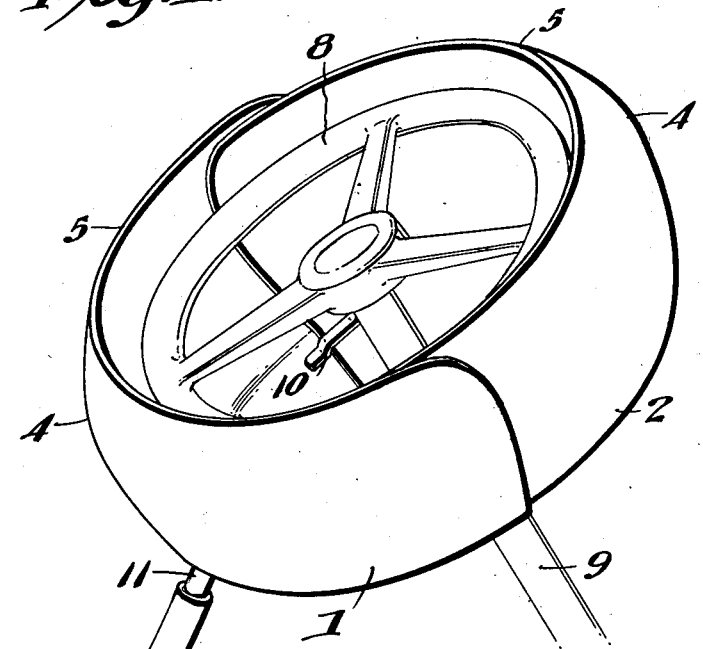
Figure 1 is a view in perspective showing, fragmentarily, the steering wheel of an automobile with one adaptation of this invention applied thereto.

With the embodiment here illustrated, the body of the device is made up of the two shell or casing portions 1 and 2, which in plan are slightly more than a semi-circle. Each one of these casing or shell members has a bottom portion 3, with a wall 4 rising from and surrounding the curved edge thereof, and upon each of the members 1 and 2, this wall is preferably contracted or slightly flanged inwardly, as at 5, adjacent to its upper end. The member 2 is preferably made of slightly less width than the shell or casing member 1, so that this member 2 will fit telescopically at its straight and open side, within the corresponding side of the member 1. The bottom portions 3 of the shell members 1 and 2 are provided with notch formations 6 and 7, so formed that when the two shell members are telescopically fitted together, these notch formations 6 and 7 cooperate to define a substantially circular central opening through the bottom portion, this opening being of sufficient size to accommodate and clear the steering column of an automobile.

In use, the parts will be fitted around the steering wheel 8 of an automobile, with the steering wheel column 9 received in the opening formed by the notches 6 and 7, and as the steering wheel and steering column are ordinarily inclined, the shell member 1 will be slightly below the shell member 2; therefore, for convenience in description and understanding, the shell member 1 can be referred to as the lower shell or casing member, and shell member 2 as the upper shell or casing member. In this arrangement, the interfitting edges of the bottom portions 3 of the two shell or casing members are so arranged that the overlapping edge of the bottom portion 3 of the upper member 2 is on the upper side to thus form an effective water shed, without the necessity of using special packings or a special interfitting water joint. The side flange portions 4 of the upper shell member 2 are disposed on the inner side of the corresponding walls of the shell member 1, and in consequence a water shed is provided at the sides, as well as at the bottom.

In order to maintain the two shell or casing members in proper interfitted relation and to hold the same together, a plurality of spring clip members 16 are provided on the bottom portion of the shell or casing member 1 and these clip or retaining members engage over and frictionally hold the overlapping water shedding edge of the bottom 3 of the shell of casing member 2. This structure is perhaps best illustrated in Fig. 6, and it will be understood that the arrangement of these parts can be varied to suit different conditions of use.

As illustrated in Figure 1, the lower shell or casing member 1 has a water or liquid discharge nipple 11 extending therefrom substantially at the point which will be lowermost when the device is fitted for use. A liquid or drain hose 12 is fitted on this nipple 11, and the hose can be extended through the door of the car, or through any other opening, to discharge waste water or cleaning fluid or liquid at any desired point.

Figure 2:
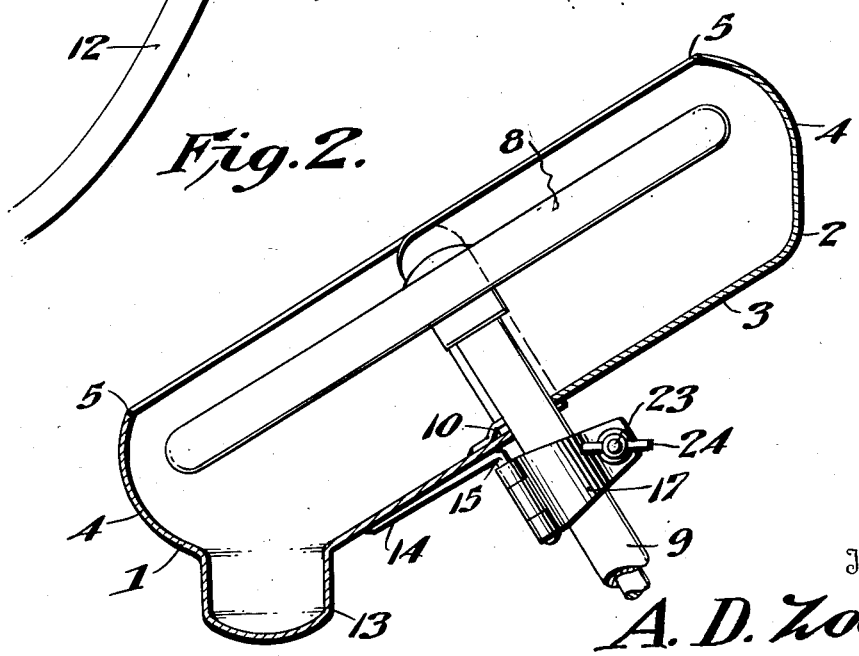
Fig. 2 is a transverse sectional view through a device embodying a slightly modified construction.

In Figs. 2 and 3 I have illustrated a slightly modified construction in which the lower shell or casing member 1 has a liquid pocket or reservoir 13 formed in the side wall thereof at the point which will be lowermost when the device is in use, and with this liquid pocket or reservoir, it is possible to retain and preserve for future use the cleansing liquid, if desired.

The device is fitted for use with the notch openings 6 and 7 around the steering wheel column 9, and the steering wheel 8 will be disposed within the circular panlike structure formed by the interfitted and associated shell or casing members 1 and 2. The wall 4 will surround the steering wheel and the flange formation 5 will prevent the cleansing liquid being splashed or spilled over the side of the pan formation. If desired, the side walls 4 can be merged in gradual curved formation in the bottom portions 3, and the flange portion 5 can be rolled or curved, the parts thus presenting rounded formations and not having sharp corners or cracks to catch and collect dirt. The relative position of the steering wheel within the panlike formation, and the distance at which the steering wheel 8 is disposed above the bottom portions 3 can be adjusted to suit the individual user, and in order that the casing or shell portions will be held in proper relation, it is necessary that some means be provided upon one of the shell members to hold upon the steering wheel column 9, or upon some other portion of the vehicle, to positively fix the mounting of the shell or casing members, and to yet leave the steering wheel 8 entirely free and unobstructed for free and ready access in washing or cleaning all portions thereof.

With the above in mind, I provide a bracket 14 on the shell or casing member 1 with a hinge pintle 15. The clamp members 16 and 17 are provided with hinge bearing formations 18 and 19, and these bearing formations are mounted on the hinge pintle or butt 15. The clamp members 16 and 17 are shaped to fit around and to clamp upon the steering wheel column 9, and are preferably provided with a lining or padding 20 to prevent marring of or injury to the finish of the steering wheel column. Clamp members 16 and 17 are provided with clamping ears 21 and 22, and a clamp bolt 23 is fitted through aligned openings in these clamping ears 21 and 22, a wing nut 24 being provided on the clamp bolt to permit tightening of the clamping members 16 and 17 in the proper clamping relation to rigidly hold the bracket portion 14, and consequently the shell or casing member 1, in desired adjusted position. Due to the interfitting mounting of the shell or casing member 2, this member will be retained in proper pan or receptacle forming relation with the shell or casing member 1. For more ready opening and closing of the clamp structure, one or both of the clamp ears 21 and 22 can be provided with slotted bolt receiving openings 25, and in fact any other well known expedients to permit fitting and removal of the clamp structure with facility and ease, can be resorted to.

With the parts constructed and arranged in the manner set forth, the pan 13, or the drain nipple and hose 11 and 12, can be employed, and as the shell or casing member 1 is mounted in lowered position, and the bottom portion of the edge of the shell or casing member 2 overlies on top, a substantially tight and water or liquid shedding casing, of pan or dishlike form, is provided. The device is fitted in place in the manner set forth, and as perhaps best illustrated in Figure 1, and the operator or workman can then readily have access to the steering wheel 8 to wash and clean the same, with a sponge, cloth, brush, or other suitable implement, and with any desired cleaning liquid or fluid. While an implement of some sort may be required for initial cleaning and for scrubbing the steering wheel, some liquid will naturally fall upon the bottom portions 3 of the shell or casing, and as a final step it may be necessary or desirable to pour water or other liquid over the steering wheel and directly over and upon the same. The side wall portions 4 and the overhanging flange formation 5 will prevent splashing or slopping over of the liquid, and the water shed interfitting of the shell portions 1 and 2 will insure that all liquid will be caught within the pan or casing and will flow to the lowermost portion of the lower casing or shell member 1. Where the construction illustrated in Figure 1 is used, liquid within the pan will flow through the nipple 11 and the drain hose 12 to be discharged from the casing or shell, and where the parts are constructed as shown in Figs. 2 and 3, the liquid pan or reservoir 13 will catch the liquid. The liquid thus caught can be reused, or can be emptied when the device is removed from the steering wheel.

From the foregoing it will be seen that I have provided a device for use in cleaning automobile and other steering wheels, which can be readily fitted in place and can be used to protect the upholstery, body portion, floor mats or carpets, and in fact all parts of the automobile or other structure, while the steering wheel is being cleaned, and that with this arrangement the steering wheel is presented to be freely accessible for thorough and complete scrubbing and washing or cleaning. Further, that the shell or casing structure encloses and surrounds the steering wheel in such a manner that all parts of the steering wheel can be reached for ready cleaning and for subsequent drying and polishing, in any manner desired.

While I have herein shown and described only certain specific embodiments of my invention and have suggested only certain possible modifications, it will be appreciated that changes and variations can be made in the form, construction, arrangement, assembly, and manner of use, without departing from the spirit and scope of my invention.

I claim:

1. A device for use in cleaning steering wheels comprising, a casing portion large enough to surround the rim of the wheel and be spaced therefrom to permit access thereto for washing purposes, and means to hold said casing portion in place.

2. A device for use in cleaning steering wheels comprising, a casing structure to be positioned around the steering wheel column as a pan beneath the steering wheel, said casing structure being large enough to surround the rim of the wheel and be spaced therefrom to permit access thereto for washing purposes and means to retain the casing structure in the desired fitted and adjusted position.

3. A device for use in cleaning steering wheels comprising, a casing structure to be positioned around the steering wheel column as a pan beneath the steering wheel, said casing structure being large enough to surround the rim of the wheel and be spaced therefrom to permit access thereto for washing purposes and clamp means engaging the steering wheel column to retain said casing structure in desired fitted and adjusted position.

4. A device for use in cleaning steering wheels comprising, two shell members to be fitted around a steering wheel to form a pan-like casing large enough to surround the rim of the wheel and be spaced therefrom to permit access to the wheel for washing purposes, and means to hold said casing in position.

5. A device for use in cleaning steering wheels comprising, a pair of substantially semi-circular shell members having side flanges and adapted to be fitted around a steering wheel to provide a pan-like casing structure large enough to surround the rim of the wheel and be spaced therefrom to permit access to the wheel for washing purposes, and means engaging the steering wheel column to retain said casing structure in place.

6. A device for use in cleaning automobile steering wheels comprising, a pair of shell members telescopically interfittable to form a substantially pan-like casing below and surrounding the steering wheel and spaced therefrom, and clamp means associated with one of said shell members to be connected upon the steering wheel column to support the casing structure in place around the steering wheel.

7. A device for use in cleaning automobile steering wheels comprising, a pair of shell members provided with side walls and constructed to be associated surrounding a steering wheel and spaced therefrom to form a substantially pan-like casing, clamp means associated with one of said shell members to be fitted upon the steering wheel column to support said member in the desired relation, and clip means to hold the shell members in the interfitted relation.

8. A device for use in cleaning automobile steering wheels comprising, a pair of substantially semi-circular casing shells provided with side walls around the curved edges thereof and adapted to have the open straight edges interfitted, clips to hold said shell members in interfitted relation, said shell members in their bottom portions being provided with registering notches to form an opening for the steering wheel column when the shell members are assembled as a pan-like casing surrounding the steering wheel and spaced therefrom, and clamp means carried by one of said shell members to be fitted and connected upon the steering wheel column to hold the casing structure in the desired fitted relation.

9. A device for use in cleaning automobile steering wheels comprising, a pair of substantially semi-circular casing shells provided with side walls around the curved edges thereof and adapted to have the open straight edges interfitted, clips to hold said shell members in interfitted relation, said shell members in their bottom portions being provided with registering notches to form an opening for the steering wheel column when the shell members are assembled as a pan-like casing surrounding the steering wheel and spaced therefrom, clamp means carried by one of said shell members to be fitted and connected upon the steering wheel column to hold the casing structure in the desired fitted relation, and liquid receiving means associated with one of the shell members to receive a cleaning liquid and take the same from the main portion of the casing.

10. A device for use in cleaning automobile steering wheels comprising, a pair of substantially semi-circular casing shells provided with side walls around the curved edges thereof and adapted to have the open straight edges interfitted, clips to hold said shell members in interfitted relation, said shell members in their bottom portions being provided with registering notches to form an opening for the steering wheel column when the shell members are assembled as a pan-like casing surrounding the steering wheel and spaced therefrom, clamp means carried by one of said shell members to be fitted and connected upon the steering wheel column to hold the casing structure in the desired fitted relation, and a drain tube leading from one of said shell members to discharge liquid therefrom.

ALVIN DEAN ZOOK.